United States Patent
Oshima et al.

(10) Patent No.: US 9,575,449 B2
(45) Date of Patent: Feb. 21, 2017

(54) FIXING MEMBER AND MANUFACTURING METHOD THEREFOR, FIXING DEVICE, AND IMAGE FORMING APPARATUS

(71) Applicant: CANON KABUSHIKI KAISHA, Tokyo (JP)

(72) Inventors: Yoshihito Oshima, Yokohama (JP); Matsutaka Maeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/719,667

(22) Filed: May 22, 2015

(65) Prior Publication Data

US 2015/0277303 A1 Oct. 1, 2015

Related U.S. Application Data (63) Continuation of application No. PCT/JP2015/000226, filed on Jan. 20, 2015.

(30) Foreign Application Priority Data

Feb. 5, 2014 (JP) .................................. 2014-020349

(51) Int. Cl.

| G03G 15/20 | (2006.01) |
|---|---|
| C08J 7/12 | (2006.01) |
| B32B 15/18 | (2006.01) |
| B32B 25/20 | (2006.01) |
| B32B 27/16 | (2006.01) |
| B32B 27/28 | (2006.01) |
| B32B 27/32 | (2006.01) |
| B32B 1/08 | (2006.01) |
| B32B 15/06 | (2006.01) |
| B32B 25/08 | (2006.01) |

(52) U.S. Cl.

CPC .............. *G03G 15/206* (2013.01); *B32B 1/08* (2013.01); *B32B 15/06* (2013.01); *B32B 15/18* (2013.01); *B32B 25/08* (2013.01); *B32B 25/20* (2013.01); *B32B 27/16* (2013.01); *B32B 27/281* (2013.01); *B32B 27/322* (2013.01); *G03G 15/20* (2013.01); *B32B 2307/306* (2013.01); *B32B 2307/51* (2013.01); *B32B 2307/554* (2013.01)

(58) Field of Classification Search

CPC .............. G03G 15/026; G03G 15/2057; G03G 15/2035; C08J 7/123

See application file for complete search history.

(56) References Cited

U.S. PATENT DOCUMENTS

| 5,399,142 A | 3/1995 | Fukunaga |
|---|---|---|
| 5,428,096 A | 6/1995 | Fukunaga |
| 8,351,837 B2 | 1/2013 | Kitano et al. |
| 8,909,119 B2 | 12/2014 | Miyahara et al. |
| 2010/0189943 A1 | 7/2010 | Qi et al. |
| 2014/0107250 A1 | 4/2014 | Maeda et al. |
| 2014/0116599 A1 | 5/2014 | Miyahara et al. |
| 2014/0116603 A1 | 5/2014 | Akiyama et al. |
| 2014/0116611 A1 | 5/2014 | Akiyama et al. |
| 2014/0116612 A1 | 5/2014 | Akiyama et al. |
| 2014/0120352 A1 | 5/2014 | Miyahara et al. |
| 2014/0133892 A1 | 5/2014 | Miura et al. |

FOREIGN PATENT DOCUMENTS

| EP | 1 016 942 A2 | 7/2000 |
|---|---|---|
| JP | 6-250553 A | 9/1994 |
| JP | 2000-194220 A | 7/2000 |
| JP | 2002-023539 A | 1/2002 |
| JP | 2004-010717 A | 1/2004 |
| JP | 2004-315833 A | 11/2004 |
| JP | 2007-047641 A | 2/2007 |
| JP | 2008-116557 A | 5/2008 |
| JP | 2010-155443 A | 7/2010 |
| JP | 2010-176130 A | 8/2010 |
| JP | 2010-181621 A | 8/2010 |
| JP | 2011-158892 A | 8/2011 |
| JP | 2012-058644 A | 3/2012 |
| JP | 2012-118371 A | 6/2012 |
| JP | 5392433 B1 | 1/2014 |

OTHER PUBLICATIONS

International Search Report in International Application No. PCT/JP2015/000226 (mailed Feb. 24, 2015).
International Preliminary Report on Patentability in International Application No. PCT/JP2015/000226 (issued Aug. 9, 2016).

*Primary Examiner* — Sanza McClendon
(74) *Attorney, Agent, or Firm* — Fitzpatrick, Cella, Harper & Scinto (57) ABSTRACT

The present invention relates to a fixing member having high abrasion resistance and being excellent in toner releasability, and a method of manufacturing the fixing member. The fixing member according to the present invention includes: a base member; an elastic layer formed on a surface of the base member; and a surface layer, in which the surface layer contains a tetrafluoroethylene-hexafluoropropylene copolymer having a specific partial structure and has a surface that forms a contact angle of 65° or more with respect to a wetting tension test mixture having a wetting tension of 31.0 mN/m.

11 Claims, 3 Drawing Sheets

FIXING MEMBER AND MANUFACTURING METHOD THEREFOR, FIXING DEVICE, AND IMAGE FORMING APPARATUS

CROSS-REFERENCE TO RELATED APPLICATIONS

This application is a continuation of International Application No. PCT/JP2015/000226, filed Jan. 20, 2015, which claims the benefit of Japanese Patent Application No. 2014-020349, filed Feb. 5, 2014.

BACKGROUND OF THE INVENTION

Field of the Invention

The present invention relates to a fixing member to be used in a heat-fixing device of an electrophotographic image forming apparatus, a method of manufacturing the fixing member, a fixing device, and to an image forming apparatus.

Description of the Related Art

As a fixing member to be used in a heat-fixing device of an electrophotographic image forming apparatus such as a printer, a copying machine, or a fax machine, there is given a fixing member having a film shape or a roller shape. As such fixing member, there has been known a fixing member that includes a film-shaped or roller-shaped base member made of a heat-resistant resin or a metal, an elastic layer made of a heat-resistant rubber or the like formed on the base member, as necessary, and a surface layer containing a fluororesin having an excellent releasability with respect to toner. In this case, as the fluororesin to be contained in the surface layer, a tetrafluoroethylene-perfluoroalkyl vinyl ether copolymer (PFA) excellent in heat resistance is preferably used.

Meanwhile, in recent years, the durability required of the fixing member tends to increase further along with an increase in printing speed. The fluororesin layer on a surface of the fixing member is chipped due to abrasion between the fluororesin layer and paper, and hence the durability of the fixing member is secured through the thickness of the fluororesin layer. Therefore, in order to increase the durability of the fixing member, a large number of studies for improving abrasion resistance of the fluororesin layer have been conducted.

In Japanese Patent Application Laid-Open No. 2010-181621, which discloses the invention relating to a non-rotary pressing member arranged on a fixing unit of an electrophotographic image forming apparatus, it is disclosed that the abrasion resistance of a crosslinked fluororesin layer formed through Steps 1 to 4 is significantly improved.

Step 1 of forming an unbaked and uncrosslinked fluororesin layer on a base member;

Step 2 of baking the fluororesin layer by heating the fluororesin layer at a temperature within a range of from a melting point (Tm) of the fluororesin to a temperature higher by 150° C. than the melting point thereof (Tm+150° C.);

Step 3 of adjusting the temperature of the baked uncrosslinked fluororesin layer at a temperature within a range of from a temperature lower by 50° C. than the melting point of the fluororesin (Tm−50° C.) to a temperature higher by 50° C. than the melting point thereof (Tm+50° C.); and Step 4 of crosslinking an uncrosslinked fluororesin by irradiating the uncrosslinked fluororesin layer adjusted for temperature with a radiation having a radiation dose within a range of from 1 to 1,000 kGy in an atmosphere having an oxygen concentration of from 0.1 to 1,000 ppm.

In addition, in Japanese Patent Application Laid-Open No. 2010-181621, as specific examples of the fluororesin, there are given polytetrafluoroethylene (PTFE), a tetrafluoroethylene-perfluoroalkyl vinyl ether copolymer (PFA), and a tetrafluoroethylene-hexafluoropropylene copolymer (FEP).

SUMMARY OF THE INVENTION

The tetrafluoroethylene-hexafluoropropylene copolymer (FEP), as well as polytetrafluoroethylene (PTFE) and the tetrafluoroethylene-perfluoroalkyl vinyl ether copolymer (PFA), is one of the most generally used fluororesins. Further, it can be said that the FEP is a material that is less expensive than the PTFE and the PFA and can be handled easily due to its low melting point and melt viscosity. However, the FEP has heat resistance lower than that of the PTFE and the PFA, and hence when the FEP is used as the surface layer of a fixing member, the fixing member is abraded away in a temperature range in which the fixing member is used (for example, 150 to 190° C.). In addition, the toner releasability of the FEP is relatively inferior to those of the PTFE and the PFA. For those reasons, it can be said that the FEP is a material that is difficult to adopt as the surface layer of the fixing member.

Under the above-mentioned circumstances, the inventors of the present invention have studied the use of the FEP as a component for the surface layer of the fixing member so as to obtain a less-costly fixing member. In this process, the inventors of the present invention applied a method involving irradiating the surface layer containing the FEP with an ionizing radiation by heating the surface layer to the vicinity of the melting point of the FEP in the absence of oxygen based on the above-mentioned disclosure of Japanese Patent Application Laid-Open No. 2010-181621. As a result, although the abrasion resistance of the surface layer was certainly improved, the toner releasability of the surface of the surface layer was not enhanced to a satisfactory level.

In the view of the foregoing, the present invention is directed to providing a fixing member being excellent in abrasion resistance and having a surface layer that contains a FEP excellent in toner releasability and a method of manufacturing the fixing member.

Further, the present invention is directed to providing a fixing device and an image forming apparatus that contribute to the stable formation of a high-quality electrophotographic image.

According to one embodiment of the present invention, there is provided a fixing member, including: a base member; an elastic layer on a surface of the base member; and a surface layer on a surface of the elastic layer. The surface layer contains a tetrafluoroethylene-hexafluoropropylene copolymer (FEP) having a partial structure represented by the following structural formula (1):

Structural Formula (1)

The surface layer has a surface whose contact angle is 65° or more with respect to a liquid mixture for a wetting tension test. The liquid mixture has a wetting tension of 31.0 mN/m.

Further, according to another embodiment of the present invention, there is provided a fixing device, including: the above-mentioned fixing member; a heating device for the fixing member; and a pressing member arranged so as to be opposed to the fixing member.

Further, according to still another embodiment of the present invention, there is provided an image forming apparatus, including the above-mentioned fixing device.

Further, according to yet another embodiment of the present invention, there is provided a method of manufacturing a fixing member, the fixing member including a base member, an elastic layer on a surface of the base member, and a surface layer containing a FEP that has a partial structure represented by the following structural formula (1), the method including a process of forming the surface layer, which includes the following steps (1) to (3):

Step (1): adjusting a temperature of a film containing an uncrosslinked FEP on a surface of the elastic layer at a temperature range of a glass transition temperature (Tg) of the uncrosslinked FEP or more and less than a melting point (Tm) of the uncrosslinked FEP minus 60° C. (Tm−60° C.);

Step (2): irradiating a surface of the film containing the uncrosslinked FEP subjected to the temperature adjustment in the step (1) with an ionizing radiation in an atmosphere having an oxygen concentration of 1,000 ppm or less, to thereby form a partial structure represented by the following structural formula (1) in the FEP; and Step (3): adjusting the temperature of the film containing the FEP that has the partial structure represented by the following structural formula (1) obtained in the step (2) at a temperature of 290° C. or more and 380° C. or less:

Structural Formula (1)

According to one embodiment of the present invention, the low-cost fixing member having high abrasion resistance and being excellent in toner releasability can be provided. Further, according to other embodiments of the present invention, the fixing device and the image forming apparatus that contribute to the stable formation of a high-quality electrophotographic image can be provided.

Further features of the present invention will become apparent from the following description of exemplary embodiments with reference to the attached drawings.

DESCRIPTION OF THE EMBODIMENTS

Preferred Embodiments of the Present Invention will now be described in detail in accordance with the accompanying drawings.

According to the present invention, a fixing member includes: a base member; an elastic layer formed on a surface of the base member; and a surface layer formed on a surface of the elastic layer, in which the surface layer contains a FEP having a partial structure represented by the following structural formula (1) and has a surface that forms a contact angle of 65° or more with respect to a wetting tension test mixture having a wetting tension of 31.0 mN/m. Thus, a low-cost fixing member having high abrasion resistance and being excellent in toner releasability can be provided:

Structural Formula (1)

Further, in order to obtain the above-mentioned fixing member, it is sufficient that the following first to third conditions be met:

(1) the first condition is that a surface of a film containing an uncrosslinked tetrafluoroethylene-hexafluoropropylene copolymer (FEP) is irradiated with an ionizing radiation in an atmosphere having an oxygen concentration of 1,000 ppm or less;

(2) the second condition is that a temperature range of the film at a time of ionizing irradiation falls within a temperature range of a glass transition temperature (Tg) of the uncrosslinked FEP or more and less than a temperature lower by 60° C. than a melting point (Tm) of uncrosslinked the FEP (Tm−60° C.); and

(3) the third condition is that the film containing the crosslinked FEP that has a partial structure represented by the structural formula (1), which has been obtained by ionizing irradiation, is reheated at a temperature of 290° C. or more and 380° C. or less.

It is generally known that, when a film containing an uncrosslinked fluororesin is irradiated with an ionizing radiation, the cleavage and crosslinking of molecular chains occur simultaneously. Further, in Japanese Patent Application Laid-Open No. 2010-181621, it is disclosed that, in the case where the temperature of the film containing the fluororesin at a time of ionizing irradiation is in the vicinity of the melting point of the fluororesin, the crosslinking of the molecular chains dominantly occurs as compared to the cleavage of the molecular chains, and the abrasion resistance is significantly improved.

In contrast, according to the present invention, it was found that the uncrosslinked FEP can be crosslinked by irradiating the film containing the uncrosslinked FEP with the ionizing radiation under a state in which the temperature is equal to or higher than the glass transition temperature of the uncrosslinked FEP and less than the melting point of the uncrosslinked FEP minus 60° C., instead of the vicinity of the melting point as disclosed in Japanese Patent Application Laid-Open No. 2010-181621, in an atmosphere having an oxygen concentration of 1,000 ppm or less.

Regarding the reason that the molecular chains are crosslinked by irradiating the film containing the FEP adjusted at the glass transition temperature or more with the ionizing radiation, the inventors of the present invention consider as follows.

Hitherto, a crosslinking technology involving irradiating a fluororesin with an ionizing radiation has been studied on polytetrafluoroethylene (PTFE) in many cases, and the fluororesin has been generally irradiated with the ionizing radiation in the vicinity of the melting point of the fluororesin. This is because, in order to crosslink the PTFE that has a stiff molecular structure close to a single chain, it is necessary to melt a crystal of the PTFE by heating the PTFE in the vicinity of the melting point thereof so that molecular chains move easily and to irradiate the PTFE with the ionizing radiation in this state. However, unlike the PTFE, as represented by the following structural formula (2), in the FEP having a flexible amorphous moiety due to a side chain, the amorphous moiety can flexibly move at a temperature equal to or higher than the glass transition temperature of the FEP, and hence the FEP can be crosslinked by ionizing irradiation at a temperature equal to or higher than the glass transition temperature of the FEP.

Structural Formula (2)

The abrasion resistance of the film containing the crosslinked FEP obtained by ionizing irradiation was significantly improved due to the crosslinked structure. However, the toner releasability was degraded or remained the same as compared to the case where the FEP was not irradiated with the ionizing radiation.

The main factor of the foregoing is considered as follows. Part of the molecular chains of the FEP is cleaved to generate a low-molecular-weight component in the film at a time of ionizing irradiation, and thus the surface energy increases. Regarding this phenomenon, the inventors of the present invention found that the film containing the crosslinked FEP is maintained at a temperature of 290° C. or more and 380° C. or less so as to cause the crosslinked FEP to have flowability, to thereby accelerate the rearrangement of molecules, and thus the surface energy can be decreased sufficiently.

Further, when a surface of a film, which was obtained by adjusting the temperature of the film containing FEP that had been crosslinked by ionizing irradiation at various temperatures equal to or higher than the glass transition temperature to 290° C. or more and 380° C. or less, was measured for a contact angle, it was revealed that the film containing the FEP that had been crosslinked at a temperature equal to or higher than the glass transition temperature and less than the melting point minus 60° C. had a large contact angle and low surface energy as compared to those of the film containing the FEP that had been crosslinked in the vicinity of the melting point.

The inventors of the present invention studied the cause of the foregoing and found that the melting heat quantity of the FEP measured with a differential scanning calorimeter (DSC) correlated to the contact angle. As the melting heat quantity is higher, the contact angle tends to increase. Further, the melting heat quantity represents the crystallization degree of the FEP, and it can be said that the crystallization degree is higher as the melting heat quantity is higher.

Therefore, when the melting heat quantity of the film containing the FEP that had been crosslinked by ionizing irradiation at various temperatures equal to or higher than the glass transition temperature was measured with the DSC, the following results were obtained. The film containing the FEP irradiated with the ionizing radiation at a temperature equal to or higher than the glass transition temperature and less than the melting point minus 60° C. had a higher melting heat quantity, that is, a higher crystallization degree, than that of the film containing the FEP irradiated with the ionizing radiation in the vicinity of the melting point.

The factor for the foregoing results is considered as follows. In the case where the FEP is crosslinked by ionizing irradiation in the vicinity of the melting point, the crystal of the FEP is melted to cause the cleavage, crosslinking, and rearrangement of the molecular chains, and hence the crystallization degree of the FEP after being crosslinked decreases. In contrast, in the case where the FEP is crosslinked by ionizing irradiation at a temperature equal to or higher than the glass transition temperature and less than the melting point minus 60° C., the cleavage, crosslinking, and rearrangement of the molecular chains occur in the amorphous moiety that can flexibly move at a temperature equal to or higher than the glass transition temperature while maintaining the crystal moiety due to the low temperature, and hence the crystallization degree is high.

It is considered that $-CF_2-$ groups in the FEP are densely arrayed in a regular manner in the crystal moiety and hence the crystal moiety has surface energy lower than that of the amorphous moiety in which molecular chains are sparsely arrayed. That is, in the case where the FEP is crosslinked by ionizing irradiation at a temperature equal to or higher than the glass transition temperature and less than the melting point minus 60° C., which is the condition under which the crystal moiety is not melted, the crosslinking proceeds while maintaining the crystal moiety, and hence the crosslinked FEP having a high crystallization degree can be obtained. Then, the film containing the crosslinked FEP having the surface energy sufficiently decreased can be obtained by reheating the obtained crosslinked FEP having a high crystallization degree.

The thus obtained film containing the crosslinked FEP was excellent in both abrasion resistance and toner releasability.

Now, the fixing member according to the present invention and a method of manufacturing the fixing member are specifically described.

(Configuration of Fixing Device)

Figure 2:
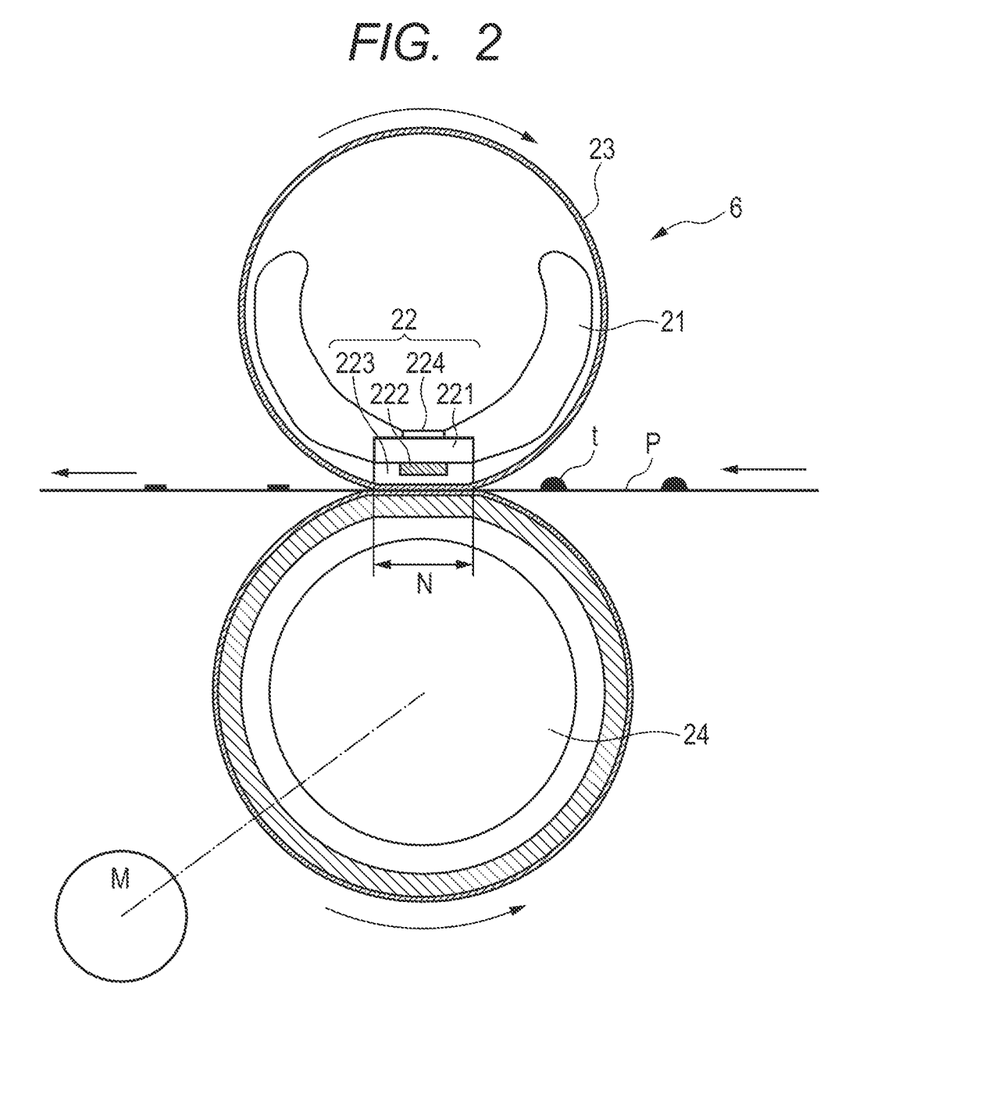
FIG. 2 is a schematic cross-sectional side view of a configuration of a fixing device according to the present invention.

In the following description, a longitudinal direction of a fixing device and members forming the fixing device refers to a direction orthogonal to a recording material conveyance direction on a surface of a recording material. A transverse direction of the fixing device and the members forming the fixing device refers to a direction parallel to the recording material conveyance direction on the surface of the recording material. A width refers to a dimension in the transverse direction. FIG. 2 is a schematic cross-sectional side view of a configuration of a fixing device 6 including the fixing member according to the present invention. As the fixing device 6, a film heating-type fixing device is used. A recording material P is conveyed in the arrow direction.

A film guide 21 is formed in a substantially semi-arc trough shape in cross section. The film guide 21 is a laterally long member having a direction perpendicular to the drawing sheet as the longitudinal direction. A heater 22 is received and supported in a groove formed in the longitudinal direction substantially at a center of a lower surface of the film guide 21.

A fixing member 23 according to the present invention has an endless belt shape (cylindrical shape) in this case. The fixing member 23 is externally fitted loosely on the film guide 21 that supports the heater 22. The film guide 21 is formed of a molded article of a heat-resistant resin such as polyphenylene sulfide (PPS) or a liquid crystal polymer.

The heater 22 forming a heating device in the fixing device is a ceramic heater that has a low heat capacity as a whole and is elongated in the longitudinal direction. The heater 22 includes a heater substrate 221 made of alumina having a thin plate shape elongated in the longitudinal direction. Then, on a front surface of the heater substrate 221 (surface on a fixing nip portion N side described later), a conductive heating element (resistance heating element) 222 made of Ag/Pd or the like having a linear shape or a thin band shape is formed in the longitudinal direction of the heater substrate 221. Then, the conductive heating element 222 is protected by a surface protective layer 223 that is formed of a thin glass layer or the like so as to cover the conductive heating element 222. On a back surface of the heater substrate 221 (surface opposite to the fixing nip portion N side), a thermometric element 224 such as a thermistor or the like is arranged as a temperature detecting member.

A pressing roller 24 serves as a pressing member. The pressing roller 24 is arranged below the fixing member 23 so as to be opposed to the fixing member 23. The pressing roller 24 is pressed against the heater 22 with a predetermined pressing force by a predetermined pressing mechanism (not shown) with the fixing member 23 nipped between the pressing roller 24 and the heater 22. An outer peripheral surface (surface) of the pressing roller 24 and an outer peripheral surface (surface) of the fixing member 23 are brought into contact with each other in accordance with the pressing force, to thereby elastically deform the pressing roller 24. With this, the nip portion N (fixing nip portion) having a predetermined width is formed between the surface of the pressing roller 24 and the surface of the fixing member 23.

(Configuration of Fixing Member)

Figure 3:
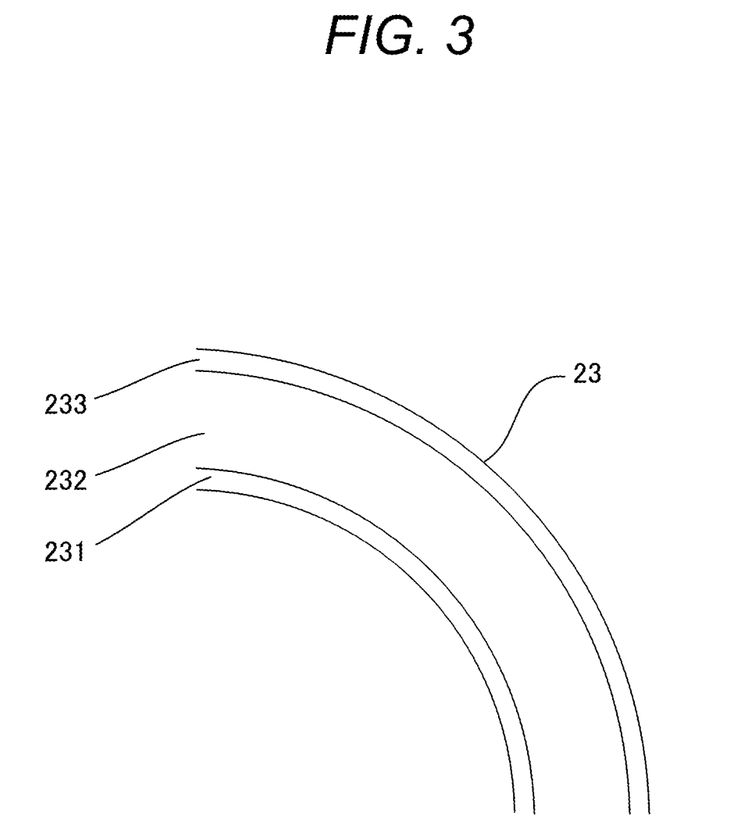
FIG. 3 is a schematic view of a sectional configuration of a fixing member according to the present invention.

FIG. 3 is a partial sectional view of the fixing member 23. In FIG. 3, the fixing member 23 includes a base member 231, an elastic layer 232, and a surface layer 233.

<Base Member>

As a material for the base member 231, a resin material such as polyimide (PI), polyamideimide (PAI), polyether ether ketone (PEEK), or polyethersulfone (PES), or a metal material such as stainless steel or nickel can be used. Further, in order to reduce a heat capacity to enhance a quick start property as the fixing device, it is preferred that the base member 231 have a thickness of from 20 to 100 μm, in particular, from 20 to 60 μm.

<Elastic Layer>

As a material for the elastic layer 232, a known elastic material can be used, and for example, silicone rubber, fluororubber, or the like can be used.

<Surface Layer>

The surface layer 233 contains a FEP that has a partial structure represented by the structural formula (1), that is, a crosslinked portion and forms a static contact angle of 65° or more with respect to a wetting tension test mixture having a wetting tension of 31.0 mN/m. In this case, the value of a static contact angle of 65° is a general value as a value of the fixing member that has a stable surface with the adhesion to toner or the like suppressed. However, the inventors of the present invention recognize that a surface layer containing a crosslinked FEP and having a stable surface with a static contact angle of at least 65° has not existed heretofore.

Note that, the static contact angle according to the present invention was measured through use of a wetting tension test mixture having a wetting tension of 31.0 mN/m. As a measurement device, an automatic contact angle meter (trade name: DM-500, manufactured by Kyowa Interface Science Co., Ltd.) was used, and the dropping amount of the wetting tension test mixture onto a surface to be measured was set to 1.2 μl. Further, an arithmetic average value of 5 to 7 measured values was defined as the value of the contact angle according to the present invention.

(Method of Manufacturing Fixing Member)

Now, a method of manufacturing a fixing member according to the present invention is specifically described.

Specifically, the fixing member according to the present invention includes a base member, an elastic layer formed on a surface of the base member, and a surface layer containing a FEP that has a partial structure represented by the structural formula (1), the surface layer being formed on a surface of the elastic layer.

In addition, the method of manufacturing the fixing member includes a process of forming a surface layer, which includes Step (1), Step (2), and Step (3).

Step (1) of adjusting a temperature of a film containing an uncrosslinked FEP formed on a surface of the elastic layer at a temperature range of a glass transition temperature (Tg) of the uncrosslinked FEP or more and less than a temperature lower by 60° C. than a melting point of the uncrosslinked FEP (Tm−60° C.);

Step (2) of irradiating a surface of the film containing the uncrosslinked FEP in the temperature range adjusted in Step (1) with an ionizing radiation in an atmosphere having an oxygen concentration of 1,000 ppm or less, to thereby form a partial structure represented by the structural formula (1) in the FEP in the film; and Step (3) of adjusting the temperature of the film containing the FEP that has the partial structure represented by the structural formula (1) obtained in Step (2) (hereinafter sometimes referred to as "crosslinked FEP") at a temperature of 290° C. or more and 380° C. or less.

Each step is hereinafter described in detail.

[Step (1)]

First, a film containing an uncrosslinked FEP is formed on a surface of an elastic layer. Then, the temperature of the film is adjusted at a temperature range of a glass transition temperature (Tg) of the FEP or more and less than a temperature lower by 60° C. than a melting point (Tm) of the FEP (Tm−60° C.).

In this case, although the FEP that is a fluororesin to be used as a main material for the surface layer in the present invention has heat resistance inferior to that of the PTFE, the FEP is excellent in processability and smoothness due to its low melting point and melt viscosity and has a low cost. The FEP is a copolymer of tetrafluoroethylene and hexafluoropropylene. Therefore, the melting point of the FEP varies depending on the polymerization ratio, the polymerization degree, and the like, but generally falls within a range of from 250° C. to 270° C. Further, the glass transition temperature of the FEP generally falls within a range of from 80° C. to 100° C.

Most of the fluororesins containing the FEP are decomposition-type resins that are subjected to only a decomposition reaction by ionizing irradiation at normal temperature.

However, when the fluororesin containing the FEP is irradiated with an ionizing radiation in a state of being heated at a temperature range of a glass transition temperature (Tg) of the FEP or more and less than a temperature lower by 60° C. than a melting point of the FEP (Tm−60° C.), a crosslinking reaction also occurs besides the decomposition reaction. Thus, it is preferred that the temperature of the film containing the uncrosslinked FEP to be subjected to an ionizing irradiation step serving as Step (2) described later be adjusted at, in particular, a temperature range of from 90 to 200° C.

Further, as a method of forming the film containing the uncrosslinked FEP resin on the surface of the elastic layer, for example, there are given the following methods (1) to (3).

(1) A dispersion in which particles made of an uncrosslinked FEP (hereinafter sometimes referred to as "uncrosslinked FEP particles") are dispersed into a colloid state in an aqueous solvent is formed into a coating film of the dispersion on a surface of an elastic layer by a known method such as spray coating or dip coating. Then, the uncrosslinked FEP particles are melted by adjusting the temperature of the coating film at a temperature equal to or higher than a melting point of the uncrosslinked FEP, to thereby form a film containing the uncrosslinked FEP.

(2) Uncrosslinked FEP particles are adhered to a surface of an elastic layer by electrostatic coating so as to form a coating film. Then, the uncrosslinked FEP particles are melted by adjusting the temperature of the coating film at a temperature equal to or higher than a melting point of the uncrosslinked FEP, to thereby form a film containing the uncrosslinked FEP.

(3) A tube containing an uncrosslinked FEP (hereinafter sometimes referred to as "uncrosslinked FEP tube") is produced by extrusion molding. A periphery of an elastic layer is covered with the uncrosslinked FEP tube, to thereby form a film containing the uncrosslinked FEP on a surface of the elastic layer.

[Step (2)]

This step involves irradiating the surface of the film containing the uncrosslinked FEP in the temperature range adjusted in Step (1) with an ionizing radiation in an atmosphere having an oxygen concentration of 1,000 ppm or less, to thereby form a partial structure represented by the structural formula (1) in the FEP.

Examples of the ionizing radiation to be used in this step include a γ-ray, an electron beam, an X-ray, a neutron beam, and a high-energy ion. Of those, an electron beam is preferred from the viewpoint of the general versatility of the device.

As a guideline of a radiation dose of the ionizing radiation, it is sufficient that an amount required for forming a crosslinked structure represented by the structural formula (1) in the uncrosslinked FEP be appropriately selected within a range of from 1 to 1,000 kGy, in particular, from 200 to 600 kGy. By setting the radiation dose within the above-mentioned range, the reduction in weight of the FEP caused by the volatilization of a low-molecular-weight component generated by the cleavage of molecular chains of the FEP can be suppressed.

The ionizing irradiation according to this step needs to be performed with respect to the film containing the uncrosslinked FEP in an atmosphere substantially free of oxygen. As a specific atmosphere, an atmosphere having an oxygen concentration of 1,000 ppm or less is preferred. When the oxygen concentration is 1,000 ppm or less, the irradiation may be performed in a vacuum or in an atmosphere of an inert gas such as nitrogen or argon. It is preferred that the irradiation be performed in an atmosphere of nitrogen from the viewpoint of a cost.

[Step (3)]

In this step, the film containing the FEP that has the partial structure represented by the structural formula (1), that is, the crosslinked structure, obtained in Step (2), is adjusted at a temperature of 290° C. or more and 380° C. or less. This step may be performed in an atmosphere of nitrogen continuously in a device in which the second step has been performed or in the air. Further, the film that has undergone the second step may be heated again at a temperature of 290° C. or more and 380° C. or less after being temporarily cooled to normal temperature.

Through this step, the toner releasability of the surface of the film containing the crosslinked FEP after ionizing irradiation can be enhanced.

The temperature range of 290° C. or more and 380° C. or less in this step is considered to be a temperature at which a crystal of an at least partially crosslinked FEP flows sufficiently and the decomposition of the crosslinked FEP does not substantially occur.

Note that, in this step, it is preferred that the film containing the crosslinked FEP be maintained within a temperature range of 290° C. or more and 380° C. or less for 5 minutes or more, in particular, 10 minutes or more. With this, the molecular chains of the crosslinked FEP flow easily, and the rearrangement of a crystal moiety obtained by the ionizing irradiation occurs, with the result that the surface energy is decreased sufficiently. As a guideline of an upper limit of the period of time for which the film containing the crosslinked FEP is maintained within the temperature range, 20 minutes or less is preferred. Specifically, it is preferred that the film containing the crosslinked FEP be maintained within the temperature range for 10 minutes or more and 20 minutes or less.

(Entire Configuration of Image Forming Apparatus)

Figure 1:
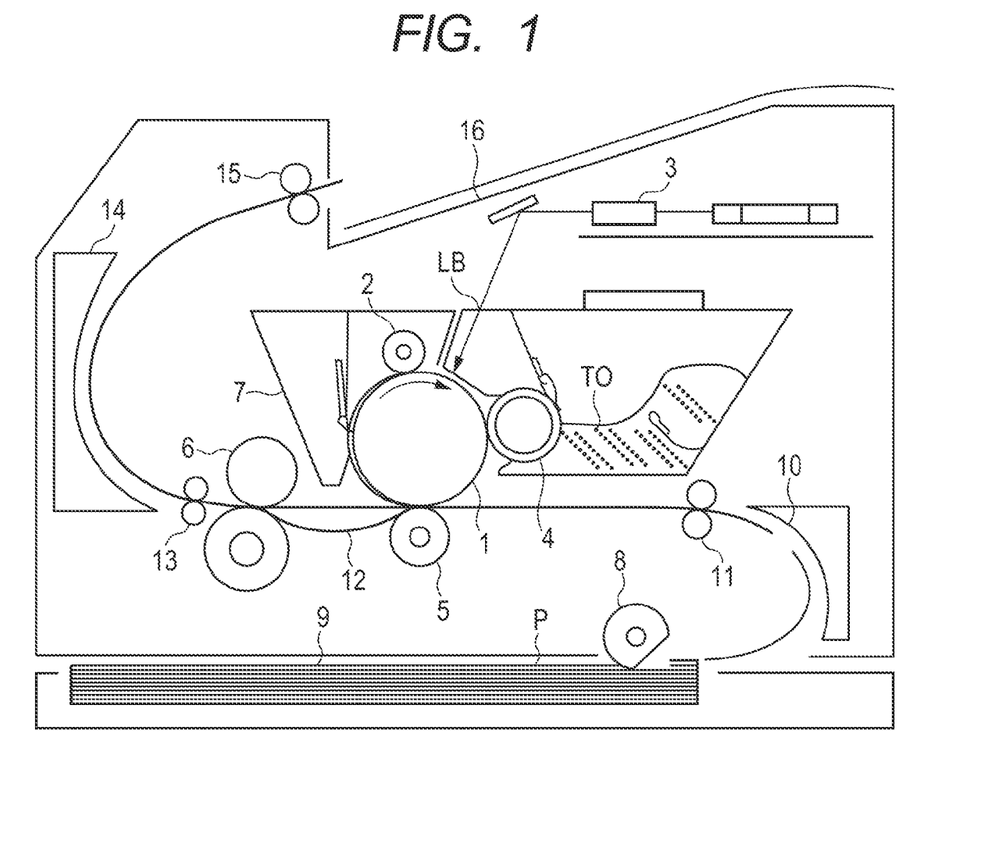
FIG. 1 is a schematic view of an exemplary general configuration of an image forming apparatus.

FIG. 1 is a schematic view of an exemplary general configuration of an image forming apparatus on which an image heating device according to the present invention is mounted as a fixing device (fixing unit). The image forming apparatus is an electrophotographic laser beam printer (hereinafter referred to as "printer").

The printer illustrated in FIG. 1 includes a rotary drum-type electrophotographic photosensitive member (hereinafter referred to as "photosensitive drum") 1 serving as an image bearing member.

The photosensitive drum 1 is rotated at a predetermined circumferential velocity (process speed) in the arrow direction in accordance with a print command. Then, in the process of rotation, an outer peripheral surface (surface) of the photosensitive drum 1 is uniformly charged to a predetermined polarity and potential by a charging roller 2 serving as charging means. The surface of the photosensitive drum 1, which has been uniformly charged, is scanned by being exposed to a laser beam LB subjected to modulation control (ON/OFF control) in accordance with image information, which is output from a laser beam scanner 3. Thus, an electrostatic latent image in accordance with intended image information is formed on the surface of the photosensitive drum 1. The latent image is developed as a toner image through use of toner TO by a developing device 4 serving as developing means so as to be visualized.

On the other hand, the recording materials P stacked and received in a feed cassette 9 are fed out one by one through the drive of a feed roller 8 and conveyed to registration rollers 11 through a sheet path including a guide 10. The registration rollers 11 feed each of the recording materials P to a transfer nip portion between the surface of the photosensitive drum 1 and an outer peripheral surface (surface) of a transfer roller 5 at a predetermined control timing. The recording material P is nipped and conveyed by the transfer nip portion, and the toner image on the surface of the photosensitive drum 1 is successively transferred onto a surface of the recording material P with a transfer bias applied to the transfer roller 5 in the process of conveyance. Thus, the recording material P bears the unfixed toner image.

The recording material P bearing the unfixed toner image (unfixed image) t is successively separated from the surface of the photosensitive drum 1 to be discharged from the transfer nip portion and guided into the nip portion N of the fixing device 6 through a conveyance guide 12. The recording material P is subjected to heat and pressure in the nip portion N of the fixing device 6, to thereby fix the toner image onto the surface of the recording material P with the heat. The recording material P output from the fixing device 6 is printed out onto a discharge tray 16 through a sheet path including conveyance rollers 13, a guide 14, and discharging rollers 15. Further, the surface of the photosensitive drum 1 after the recording material is separated therefrom is cleaned through removal processing for adhering contaminants such as transfer residual toner by a cleaning device 7 serving as cleaning means, used for forming images repeatedly.

(Heating and Fixing Operation of Fixing Device)

When a fixing motor M serving as a drive source is rotationally driven in accordance with the print command, the rotation force of the fixing motor M is transmitted to the pressing roller 24 through a power transmission mechanism (not shown). With this, the pressing roller 24 is rotated at the predetermined circumferential velocity (process speed) in the arrow direction. The rotation of the pressing roller 24 is transmitted to the surface of the fixing member (hereinafter sometimes referred to as "fixing belt") 23 having an endless belt shape through the nip portion N so that the fixing belt 23 rotates in the arrow direction following the rotation of the pressing roller 24.

EXAMPLES

Now, the present invention is more specifically described by way of Examples. Note that, Examples described below are exemplary embodiments to which the present invention is applicable, but the present invention is not limited to only Examples described below and various modifications are possible within the scope of the spirit of the present invention.

Example 1

As a base member for a fixing belt serving as a fixing member according to the present invention, a stainless-steel film having an outer diameter of 30 mm, a thickness of 40 µm, and an axial length of 400 mm was prepared.

A liquid silicone rubber mixture containing an addition curable silicone rubber (trade name: XE15-B9236, manufactured by Momentive Performance Materials Japan LLC) was applied onto the stainless-steel film through use of a ring-shaped coating head, to thereby form a coating film of the liquid silicone rubber mixture. The coating film had a thickness of 300 µm. Then, the coating film was heated to 200° C. so as to react the addition curable silicone rubber in the coating film, and thus an elastic layer containing silicone rubber was formed.

Next, a surface of the elastic layer was treated with excimer UV light, and thereafter a primer (trade name: EK-1909S21L, manufactured by Daikin Industries, Ltd.) was uniformly applied onto the surface to a thickness of 2 µm by spray coating and dried.

[Step (1)]

Then, an aqueous dispersion coating material containing uncrosslinked FEP particles (trade name: ND-110, manufactured by Daikin Industries, Ltd.) was applied onto the resultant elastic layer by spray coating so that the thickness after baking became 25 µm, and thus a coating film having the uncrosslinked FEP particles dispersed therein was formed to a thickness of 50 µm. The coating film was heated to 350° C. and maintained at this temperature for 15 minutes so as to melt the uncrosslinked FEP particles in the coating film, and thus a film of the uncrosslinked FEP resin was formed.

The film of the uncrosslinked FEP resin thus formed had a melting point (Tm) of 241° C. and a glass transition temperature (Tg) of 90° C. Note that, the melting point and the glass transition temperature of the uncrosslinked FEP resin were measured by the following methods. Specifically, the melting point (Tm) was measured by the following methods. 5 mg of a sample taken from the film of the uncrosslinked FEP resin is heated at a temperature rise rate of 20° C./min through use of a differential scanning calorimeter (DSC) (trade name: DSC823, manufactured by Mettler-Toledo International Inc.). A peak top temperature in the highest endothermic peak in a chart to be obtained is defined as the melting point of the film of the uncrosslinked FEP.

Further, the glass transition temperature (Tg) was measured by the following methods. 5 mg of a sample taken from the film of the uncrosslinked FEP resin is heated at a frequency of 10 Hz and a temperature rise rate of 5° C./min through use of a dynamic mechanical analyzer (DMA) (trade name: Rheogel-E4000, manufactured by UBM). A peak top temperature in an inflection point peak of tan δ in a chart to be obtained is defined as a grass transition point (Tg).

[Step (2)]

The stainless-steel film on which the elastic layer and the film of the uncrosslinked FEP resin formed on the surface of the elastic layer were thus laminated in the stated order was placed in a heating furnace having an oxygen concentration of 1,000 ppm or less, and the surface of the film of the uncrosslinked FEP resin was irradiated with an electron beam so that the radiation dose became 200 kGy while the temperature of the film of the uncrosslinked FEP resin was maintained at 150° C. Thus, the FEP resin was crosslinked.

[Step (3)]

After the completion of the irradiation with the electron beam, the stainless-steel film was taken out from the heating furnace and placed in another heating furnace having an atmosphere of the air. The film containing the crosslinked FEP resin (hereinafter sometimes referred to as "film of the crosslinked FEP resin" was reheated to 350° C. in the atmosphere of the air and maintained at this temperature for 15 minutes. The resultant film of the FEP resin was defined as a surface layer of the fixing belt according to the present invention. The fixing member according to the present invention thus obtained was subjected to Evaluations 1 to 5 described below.

<Evaluation 1> Analysis of Crosslinked Structure in FEP Resin Obtained in Second Step (Confirmation of Presence/Absence of Crosslinking Point Peak)

The presence of the structure represented by the structural formula (1) in the FEP resin, that is, the presence/absence of the crosslinked structure can be confirmed by nuclear magnetic resonance spectrometry (19F-NMR) using a fluorine nucleus.

There is no solvent capable of dissolving a fluororesin, and hence the resin is measured in a solid state. As represented by the following structural formula (2), it is known that a main chain of the FEP is straight and the portions other than a side chain do not have a branched structure.

Structural Formula (2)

In this case, when the FEP heated at a temperature equal to or higher than the glass transition temperature (Tg) in an atmosphere of low oxygen is irradiated with an electron beam, the cleavage and crosslinking of the molecular chains of the FEP occur, with the result that a branched structure represented by the following structural formula (1) is newly formed.

Structural Formula (1)

Fluorine on carbon adjacent to tertiary carbon newly formed in the thus newly formed partial structure represented by the structural formula (1) has a peak in the vicinity of −103 ppm in a 19F-NMR spectrum. Thus, based on the appearance of the new peak (crosslinking point peak) in the vicinity of −103 ppm in the 19F-NMR spectrum, it can be confirmed that the partial structure represented by the structural formula (1) is present in the FEP, and the presence/absence of the crosslinked structure can be determined. Further, the measurement temperature in this case is 250° C., and the peak value is determined by using benzene hexafluoride as an external reference.

In Example 1, in order to confirm that the partial structure represented by the structural formula (1) was formed in a molecule of the FEP in the surface layer of the fixing belt obtained in the second step, a part of the surface layer was cut out and analyzed by 19F-NMR (trade name: Varian NMR System 400WB, manufactured by Varian, Inc.). As a result, the expression of a new peak was recognized in the vicinity of −103 ppm.

Further, in order to confirm that the partial structure represented by the structural formula (1) was maintained in the molecule of the FEP in the surface layer of the fixing belt obtained through the third step, a part of the surface layer was cut out and analyzed by 19F-NMR. As a result, the expression of a peak was recognized in the vicinity of −103 ppm.

<Evaluation 2> Measurement of Contact Angle of Surface of Surface Layer

The contact angle was measured through use of a wetting tension test mixture (trade name: Wetting Tension Test Mixture No. 31.0, manufactured by Wako Pure Chemical Industries, Ltd.) having a wetting tension of 31.0 mN/m. As a measurement device, an automatic contact angle meter (trade name: DM-500, manufactured by Kyowa Interface Science Co., Ltd.) was used, and the dropping amount of the wetting tension test mixture onto a surface to be measured was set to 1.2 µl. Further, an arithmetic average value of 5 to 7 measured values was defined as the value of the contact angle according to the present invention.

<Evaluation 3> Measurement of Melting Heat Quantity of Surface Layer

The melting heat quantity was determined by measuring a peak area detected as a melting peak when the surface layer was heated at a temperature rise rate of 20° C./min through use of a differential scanning calorimeter (DSC) (trade name: DSC823, manufactured by Mettler-Toledo International Inc.).

<Evaluation 4> Evaluation of Toner Releasability of Surface Layer

The toner releasability was evaluated as follows. The produced fixing film was incorporated into a fixing device of a color laser printer (trade name: LBP5910, manufactured by Canon Inc.). Then, A4-size plain paper (trade name: CS-814, manufactured by Canon Inc.) was caused to continuously pass through the color laser printer by lateral feeding, and thus an electrophotographic image was formed on the plain paper. As the electrophotographic image, a line pattern of four colors: yellow, magenta, cyan, and black was formed.

Then, the presence/absence of an offset of toner in the formed electrophotographic image was visually observed, and the number of sheets, at which the electrophotographic image observed to have an offset of toner was first output, was recorded. That is, it can be considered that the surface of the fixing belt has maintained a satisfactory toner releasability until this number of sheets.

Note that, in the case where the electrophotographic image having an offset of toner was not observed even after 150,000 (150K) sheets of the electrophotographic image were continuously output, the formation of the electrophotographic image was ended at that time.

<Evaluation 5> Measurement of Abrasion Amount of Surface Layer

The abrasion of the surface layer was evaluated as follows. Specifically, the produced fixing film was mounted as a fixing film of a color laser printer (trade name: LBP5910, manufactured by Canon Inc.) equipped with a fixing device having the structure illustrated in FIG. 2. A4-size plain paper (trade name: CS-814, manufactured by Canon Inc.) was caused to continuously pass through the color laser printer by lateral feeding, and thus a line pattern of four colors: yellow, magenta, cyan, and black was printed on the plain paper.

Then, the formation of the electrophotographic image was stopped when the electrophotographic image, in which a decrease in toner releasability was first recognized in Evaluation 4, was formed. The abrasion amount (depth) of a portion of a surface of the surface layer of the fixing belt at this time, the portion being brought into contact with both longitudinal ends of the plain paper, was measured through use of a non-contact white-light interferometer (trade name: VertScan R3300H, manufactured by Ryoka Systems Inc.). The reason for measuring the abrasion amount of this portion is that this portion abrades away most due to the friction with the ends of the plain paper.

Further, the reason for measuring the abrasion amount of the surface layer with respect to the fixing member at a time of a decrease in toner releasability, that is, at a time when the electrophotographic image first recognized to have an offset of toner is obtained is as follows. Specifically, the inventors of the present invention considered that the function of the fixing member was decreased at a time of the occurrence of an offset of toner and determined that it was useless to continuously evaluate the fixing member having the function decreased. Therefore, the inventors measured the abrasion amount of the surface layer at this time.

Example 2

A fixing belt was produced in the same way as in Example 1 except for setting the temperature of the film of the uncrosslinked FEP resin to 90° C. at a time of irradiation with an electron beam and subjected to Evaluations 1 to 5.

Example 3

A fixing belt was produced in the same way as in Example 1 except for setting the temperature of the film of the uncrosslinked FEP resin to 180° C. at a time of irradiation with an electron beam and subjected to Evaluations 1 to 5.

Comparative Example 1

A fixing belt was produced in the same way as in Example 1 except for setting the temperature of the film of the uncrosslinked FEP resin to 250° C. at a time of irradiation with an electron beam and subjected to Evaluations 1 to 5.

Comparative Example 2

As a base member for a fixing belt, a stainless-steel film having an outer diameter of 30 mm, a thickness of 40 μm, and an axial length of 400 mm was prepared.

An elastic layer made of a silicone rubber having a thickness of 300 μm was formed on the stainless-steel film. A surface of the elastic layer was treated with excimer UV light, and thereafter a primer (trade name: EK-1909S21L, manufactured by Daikin Industries, Ltd.) was uniformly applied onto the surface to a thickness of 2 μm by spray coating and dried.

Then, an aqueous dispersion coating material containing uncrosslinked FEP particles (trade name: ND-110, manufactured by Daikin Industries, Ltd.) was applied onto the resultant elastic layer by spray coating so that the thickness after baking became 25 μm, and thus a coating film having the uncrosslinked FEP particles dispersed therein was formed to a thickness of 50 μm. The coating film was heated to 350° C. and maintained at this temperature for 15 minutes so as to melt the uncrosslinked FEP particles in the coating film, and thus a film of the uncrosslinked FEP resin was formed.

The stainless-steel film on which the elastic layer and the film of the uncrosslinked FEP resin formed on the surface of the elastic layer were thus laminated in the stated order was placed in a heating furnace having an oxygen concentration of 1,000 ppm or less, and the surface of the film of the uncrosslinked FEP resin was irradiated with an electron beam so that the radiation dose became 200 kGy while the temperature of the film of the uncrosslinked FEP resin was maintained at 150° C. The fixing belt thus obtained was subjected to Evaluations 1 to 5 described above. That is, in this comparative example, the film of the FEP resin after the irradiation with an electron beam was not reheated.

Comparative Example 3

A fixing belt was produced in the same way as in Comparative Example 1 except for setting the temperature of the film of the uncrosslinked FEP resin at a time of irradiation with an electron beam at 18° C., and except for not subjecting reheating after the irradiation with an electron beam. The fixing belt thus obtained was subjected to Evaluations 1 to 3 described above.

Further, in this comparative example, Evaluation 5 (measurement of an abrasion amount) was performed prior to Evaluation 4. The reason for this is as follows. The film of the uncrosslinked FEP resin was irradiated with an electron beam while the temperature of the film was maintained at 18° C. Therefore, the crosslinking of the FEP did not proceed, and thus the abrasion resistance was predicted to be low.

Then, in Evaluation 5, abrasion of a thickness (25 μm) of the surface layer was recognized in the fixing belt according to this comparative example at a time when 3,000 sheets of the electrophotographic image were formed. Therefore, Evaluation 4 (evaluation of a toner releasability) was not performed.

Comparative Example 4

As a base member for a fixing belt, a stainless-steel film having an outer diameter of 30 mm, a thickness of 40 μm, and an axial length of 400 mm was prepared.

An elastic layer made of a silicone rubber having a thickness of 300 μm was formed on the stainless-steel film. A surface of the elastic layer was treated with excimer UV light, and thereafter a primer (trade name: EK-1909S21L, manufactured by Daikin Industries, Ltd.) was uniformly applied onto the surface to a thickness of 2 μm by spray coating and dried. An aqueous dispersion coating material containing uncrosslinked FEP particles (trade name: ND-110, manufactured by Daikin Industries, Ltd.) was uniformly applied onto the film thus obtained by spray coating so that the thickness after baking became 25 μm. Then, the resultant was baked at 350° C. for 15 minutes so as to form a surface layer, to thereby produce a fixing belt. That is, in this comparative example, the irradiation with an electron beam was not performed, and the film of the FEP resin after the irradiation with an electron beam was not reheated, either. The fixing belt according to this comparative example thus obtained was subjected to Evaluations 1 to 3.

Further, the fixing belt according to this comparative example was also subjected to Evaluation 5 prior to Evaluation 4 in the same way as in Comparative Example 3. The reason for this is as follows. The surface layer according to this comparative example was formed of the film of the uncrosslinked FEP resin, and hence the abrasion resistance was predicted to be low. In Evaluation 5, abrasion of a thickness (25 μm) of the surface layer was recognized in the fixing belt according to this comparative example at a time when 2,000 sheets of the electrophotographic image were formed. Therefore, Evaluation 4 was not performed.

Table 1 below shows the evaluation results of Examples 1 to 3 and Comparative Examples 1 to 4.

TABLE 1

|  | Radiation dose of electron beam (kGy) | Temperature at time of irradiation (° C.) | Presence/ absence of reheating after irradiation with electron beam | Evaluation 1 Presence/ absence of crosslinking point peak | Evaluation 2 Contact angle (°) | Evaluation 3 Melting heat quantity (J/g) | Evaluation 4 Toner releasability (number of sheets) | Evaluation 5 Abrasion amount (μm) |
|---|---|---|---|---|---|---|---|---|
| Example 1 | 200 | 150 | Present | Present | 66 | 39 | 150,000 | 0 (*1) |
| Example 2 | 200 | 90 | Present | Present | 66 | 37 | 150,000 | 0 (*1) |
| Example 3 | 200 | 180 | Present | Present | 65 | 35 | 150,000 | 0 (*1) |
| Comparative Example 1 | 200 | 250 | Present | Present | 63 | 26 | 112,000 | 0 (*2) |
| Comparative Example 2 | 200 | 150 | Absent | Present | 61 | 33 | 52,000 | 0 (*3) |
| Comparative Example 3 | 200 | 18 | Absent | Absent | 42 | 27 | — | 25 (*4) |
| Comparative Example 4 | — | — | Absent | Absent | 63 | 22 | — | 25 (*5) |

(*1): A fixing belt after the formation of 150,000 sheets of the electrophotographic image was measured.
(*2): A fixing belt after the formation of 112,000 sheets of the electrophotographic image was measured.
(*3): A fixing belt after the formation of 52,000 sheets of the electrophotographic image was measured.
(*4): A fixing belt after the formation of 3,000 sheets of the electrophotographic image was measured.
(*5): A fixing belt after the formation of 2,000 sheets of the electrophotographic image was measured.

From the results of the NMR, a crosslinking point peak was observed in Examples 1 to 3 and Comparative Example 2 in which the irradiation with an electron beam was performed at a temperature equal to or higher than the glass transition temperature. That is, it is understood that a crosslinked structure was formed at least in a part of the FEP by the irradiation with an electron beam with respect to the film of the uncrosslinked resin heated at a temperature range of the glass transition temperature or more and less than the melting point minus 60°.

Further, from the measurement results of the abrasion amount, abrasion of the surface layer was not recognized visually even after the continuous formation of 150,000 sheets (hereinafter sometimes referred to as "150K sheets") of the electrophotographic image in Examples 1 to 3. On the other hand, abrasion of 25 μm had already occurred in the surface layer after the continuous formation of 2,000 sheets of the electrophotographic image in the fixing belt according to Comparative Example 4. From the comparison of those results, it was able to be confirmed that the abrasion resistance of the surface layer was improved by the crosslinking of the FEP.

Further, regarding Example 1 and Comparative Example 2, from the comparison of the results of Evaluation 2, it is understood that the value of the contact angle was increased to enhance the toner releasability by reheating.

Further, regarding Examples 1 to 3 and Comparative Example 1, from the comparison of the results of Evaluations 2 and 4, it is understood that the value of the contact angle was higher and the toner releasability was more satisfactory in Examples 1 to 3.

Still further, from the comparison of the value of the melting heat quantity according to Evaluation 3, it is understood that the values in Examples 1 to 3 were higher than that in Comparative Example 1 and hence the crystallization degrees of Examples 1 to 3 were higher than that of Comparative Example 1. It is considered that the high crystallization degrees contributed to the enhancement of the toner releasability according to Evaluation 4.

As shown in the "toner releasability" column of Table 1, an offset of toner was not confirmed even after 150,000 sheets of the electrophotographic image were output continuously in Examples 1 to 3 in which the contact angle was 65° or more. In contrast, an offset of toner occurred when 112,000 sheets of the electrophotographic image and 52,000 sheets of the electrophotographic image were continuously output respectively in Comparative Examples 1 and 2 in which the contact angle was less than 650.

It is understood from those results that, when an uncrosslinked FEP is irradiated with an electron beam under a state in which the temperature is equal to or higher than the glass transition temperature of the uncrosslinked FEP and less than a temperature lower by 60° C. than the melting point (Tm) of the uncrosslinked FEP (Tm−60° C.) in an atmosphere having an oxygen concentration of 1,000 ppm or less, a crosslinked structure is formed in the FEP to improve the abrasion resistance thereof.

Further, from the measurement of the contact angle after reheating and the measurement of the toner releasability, it is understood that the FEP crosslinked film subjected to reheating after the formation of the crosslinked structure has a contact angle of 65° or more with respect to a wetting tension test mixture having a wetting tension of 31.0 mN/m and has a sufficient toner releasability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-020349, filed Feb. 5, 2014, which is hereby incorporated by reference herein in its entirety.

What is claimed is:

1. A fixing member, comprising:

a base member;

an elastic layer on a surface of the base member; and a surface layer, wherein the surface layer contains a tetrafluoroethylene-hexafluoropropylene copolymer having a partial structure represented by structural formula (1):

structural formula (1)

and wherein the surface layer has a surface having a contact angle of 65° or more with respect to a liquid mixture for a wetting tension test, the liquid mixture having a wetting tension of 31.0 mN/m.

2. The fixing member according to claim 1, wherein the surface layer is produced by:

irradiating a layer containing an uncrosslinked tetrafluoroethylene-hexafluolopropylene copolymer with an ionizing radiation at a temperature equal to or higher than a glass transition temperature of the uncrosslinked tetrafluoroethylele-hexafluoropropylene copolymer and less than a melting point of the uncrosslinked tetrafluoroethylele-hexafluoropropylene copolymer minus 60° C. in an atmosphere having an oxygen concentration of 1,000 ppm or less, to form a layer containing the tetrafluoroethylene-hexafluolopropylene copolymer having the partial structure represented by the structural formula (1), and thereafter, heating the layer containing the tetrafluoroethylene-hexafluolopropylene copolymer having the partial structure represented by the structural formula (1) at a temperature of 290° C. to 380° C.

3. The fixing member according to claim 1, wherein the elastic layer contains a silicone rubber.

4. The fixing member according to claim 1, wherein the base member contains at least one resin selected from the group consisting of polyimide, polyamideimide, and polyethersulfone.

5. The fixing member according to claim 1, wherein the base member contains nickel or stainless steel.

6. The fixing member according to claim 1, wherein the base member has a thickness of from 20 to 60 μm.

7. A fixing device, comprising:
the fixing member of claim 1;
a heating device for heating the fixing member; and
a pressing member arranged so as to be opposed to the fixing member.

8. An image forming apparatus, comprising the fixing device of claim 7.

9. A method of manufacturing a fixing member, the fixing member comprising a base member, an elastic layer on a surface of the base member, and a surface layer containing a tetrafluoroethylene-hexafluoropropylene copolymer that has a partial structure represented by structural formula (1):

structural formula (1)

the method comprising a process of forming the surface layer, which includes the steps (1) to (3):

(1) adjusting a temperature of a film containing an uncrosslinked tetrafluoroethylene-hexafluoropropylene copolymer on a surface of the elastic layer at a temperature in a range from a glass transition temperature of the tetrafluoroethylene-hexafluoropropylene copolymer to less than a melting point (Tm) of the tetrafluoroethylene-hexafluoropropylene copolymer minus 60° C. (Tm−60° C.);

(2) irradiating a surface of the film containing the uncrosslinked tetrafluoroethylene-hexafluoropropylene copolymer in the temperature range adjusted in the step (1) with an ionizing radiation in an atmosphere having an oxygen concentration of 1,000 ppm or less to form the partial structure represented by the structural formula (1) in the tetrafluoroethylene-hexafluoropropylene copolymer; and (3) after the step (2), adjusting the temperature of the film containing the tetrafluoroethylene-hexafluoropropylene copolymer that has the partial structure represented by the structural formula (1) obtained in the step (2) to a temperature of 290° C. to 380° C.

10. The method according to claim 9, wherein the step (3) includes maintaining the temperature of the film containing the tetrafluoroethylene-hexafluoropropylene copolymer having the partial structure represented by the structural formula (1) at 290° C. to 380° C. or less for at least 5 minutes.

11. The method according to claim 10, wherein the step (3) comprises maintaining the temperature of the film containing the tetrafluoroethylene-hexafluoropropylene copolymer having the partial structure represented by the structural formula (1) at 290° C. to 380° C. for 10 minutes to 20 minutes.

* * * * *